(12) United States Patent
Akkary et al.

(10) Patent No.: US 6,247,121 B1
(45) Date of Patent: Jun. 12, 2001

(54) MULTITHREADING PROCESSOR WITH THREAD PREDICTOR

(75) Inventors: Haitham Akkary, Portland, OR (US); Quinn A. Jacobson, Madison, WI (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 09/157,791

(22) Filed: Sep. 21, 1998

Related U.S. Application Data

(63) Continuation-in-part of application No. 08/992,375, filed on Dec. 16, 1997.

(51) Int. Cl.[7] .................................................. C06F 15/00
(52) U.S. Cl. .......................... 712/239; 712/32; 712/216; 712/228; 712/233; 712/237; 712/238; 712/239; 712/240; 709/112
(58) Field of Search ............................ 712/32, 216, 228, 712/240, 233, 234, 235, 236, 237, 238, 239; 709/112

(56) References Cited

U.S. PATENT DOCUMENTS

| | | | |
|---|---|---|---|
| 5,142,634 | 8/1992 | Fite et al. | 712/240 |
| 5,153,848 | 10/1992 | Elkind et al. | 708/503 |
| 5,309,561 | 5/1994 | Overhouse et al. | 709/400 |
| 5,313,634 | 5/1994 | Eickemeyer | 712/240 |
| 5,420,990 | 5/1995 | McKeen et al. | 712/216 |
| 5,421,021 | 5/1995 | Saini | 712/211 |
| 5,524,250 | 6/1996 | Chesson et al. | 712/228 |
| 5,524,262 | 6/1996 | Colwell et al. | 712/213 |
| 5,546,593 | 8/1996 | Kimura et al. | 712/228 |
| 5,586,278 | 12/1996 | Papworth et al. | 712/235 |
| 5,588,126 | 12/1996 | Abramson et al. | 712/200 |
| 5,606,670 | 2/1997 | Abramson et al. | 711/154 |
| 5,613,083 | 3/1997 | Glew et al. | 711/207 |

(List continued on next page.)

OTHER PUBLICATIONS

M. Franklin, "The Multiscalar Architecture," Ph.D. Dissertation, Univ. of Wisconsin, 1993, pp. i, ii, v–ix, 50–73, 75–81, 86–107, and 153–161.

(List continued on next page.)

Primary Examiner—John A. Follansbee
Assistant Examiner—Dzung C Nguyen
(74) Attorney, Agent, or Firm—Alan K. Aldous

(57) ABSTRACT

In one embodiment, a processor includes thread management logic including a thread predictor having state machines to indicate whether thread creation opportunities should be taken or not taken. The processor includes a predictor training mechanism to receive retired instructions and to identify potential threads from the retired instructions and to determine whether a potential thread of interest meets a test of thread goodness, and if the test is met, one of the state machines that is associated with the potential thread of interest is updated in a take direction, and if the test is not met, the state machine is updated in a not take direction. The thread management logic may control creation of an actual thread and may further include reset logic to control whether the actual thread is reset and wherein if the actual thread is reset, one of the state machines associated with the actual thread is updated in a not take direction. The final retirement logic may control whether the actual thread is retired, and wherein if the actual thread is retired, the state machine associated with the actual thread is updated in a take direction. The circuitry may be used in connection with a multi-threading processor that detects speculation errors involving thread dependencies in execution of the actual threads and re-executes instructions associated with the speculation errors from trace buffers outside an execution pipeline.

22 Claims, 10 Drawing Sheets

U.S. PATENT DOCUMENTS

| | | | |
|---|---|---|---|
| 5,664,137 | 9/1997 | Abramson et al. | 712/216 |
| 5,724,565 | 3/1998 | Dubey et al. | 712/245 |
| 5,742,782 | 4/1998 | Ito et al. | 712/245 |
| 5,754,818 | 5/1998 | Mohamed | 711/207 |
| 5,802,272 | 9/1998 | Sites et al. | 714/45 |
| 5,812,811 | 9/1998 | Dubey et al. | 712/216 |
| 5,832,260 | 11/1998 | Arora et al. | 712/239 |
| 5,881,280 | 3/1999 | Gupta et al. | 712/244 |
| 5,887,166 | 3/1999 | Mallick et al. | 709/112 |
| 5,933,627 | 8/1999 | Parady | 711/141 |
| 5,961,639 | 10/1999 | Mallick et al. | 712/224 |

OTHER PUBLICATIONS

M. Franklin et al., ARB: A Hardware Mechanism for Dynamic Reordering of Memory References, IEEE Transactions on Computers, vol. 45, No. 5, May 1996, pp. 552–571.

E. Rotenberg et al., "Trace Processors," The 30th International Symposium on Microarchitecture, Dec. 1997, pp. 138–148.

J. Smith et al., "The Microarchitecture of Superscaler Processors," Proceedings of the IEEE, vol. 83, No. 12, Dec. 1995, pp. 1609–1624.

G. Sohi et al., "Multiscalar Processors". The 22nd Annual International Symposium on Computer Architecture, Jun. 1995, pp. 414–425.

P. Song, "Multithreading Comes of Age," Microprocessor Report, Jul. 14, 1997, pp. 13–18.

J. Tsai et al., "The Superthreaded Architecture: Thread Pipelining with Run–Time Data Dependence Checking and Control Speculation," Proceedings of the 1996 Conference on Parallel Architectures and Compilation Techniques, Oct. 1996, pp. 35–46.

D. Tullsen et al., "Simultaneous Multithreading: Maximizing On–Chip Parallelism," The 22nd International Symposium on Computer Architecture, Jun. 1995, pp. 392–403.

U.S. application No. 08/746,547, filed Nov. 13, 1996, pending, "Processor Having Replay Architecture," Inventor David Sager.

J.C. Steffan et al., "The Potential for Using Thread–Level Data Speculation to Facilitate Automatic Parallelization," 4th International Symposium on High performance Computer Architecture—HPCA–4, pp. 2–13, Jan. 1998.

S. Gopal et al., "Speculative Versioning Cache," 4th International Symposium on High–Performance Computer Architecture—HPCA–4, pp. 195–205, Jan. 1998.

P. Marcuello et al., "Speculative Multithreading Processors," Proceedings of the ACM International Conference on Supercomputing 98, Jul. 1998, pp. 77–84.

N. Gloy et al., "An Analysis of Dynamic Branch Preduction Schemes on System Workloads," Proceedings, 23rd Annual International Symposium on Computer Architecture, May 1996, pp. 12–21.

S. McFarling, "Combining Branch Predictors," WRL Technical Note TN–36, Wetern Research Laboratory, Jun. 1993, pp. 1–20.

Q. Jacobson et al. "Path–Based Next Trace Prediction," Proceedings of the 30th International Symposium on Microarchitecture, Dec. 1997, pp. 14–23.

Q. Jacobson et al. "Control Flow Speculation in Multiscalar Processors," Proceedings of the 3rd International Symposium on High–Performance Computer Architecture, Feb. 1997, pp. 218–229.

R. Nair, "Dynamic path–based branch correlation," Proceedings of the 28th International Symposium on Microarchitecture, Dec. 1995, pp. 15–23.

S. Palacharla et al., "Complexity–Effective Superscalar Processors," The 24th Annual International Symposium, on Computer Architecture, pp. 206–218, Jun. 1997.

M. Lipasti et al., "Value Locality and Load Value Prediction," Proceedings of Seventh International Conference on Architectural Support for Programming Languages and Operating Systems, Oct. 1996, ASPLOS–VII, pp. 138–147.

TREE AT TIME t1

TREE AT TIME t2 ASSUMING THREAD T4 IS RESET BEFORE THREAD T1 RETIRES

TREE AT TIME t2 ASSUMING THREAD T1 RETIRES BEFORE THREAD T4 IS RESET

TREE AT TIME t3 AFTER THREAD T1 HAS RETIRED AND THREAD T4 IS RESET

FIG. 14A, FIG. 14B, FIG. 14C, FIG. 14D, FIG. 14E, FIG. 14F

MULTITHREADING PROCESSOR WITH THREAD PREDICTOR

RELATED APPLICATION

The present application is a continuation-in-part of U.S. application Ser. No. 08/992,375, filed Dec. 16, 1997, now pending.

BACKGROUND OF THE INVENTION

1. Technical Field of the Invention

The present invention relates to processors and, more particularly, to creation and management of threads in a processor.

2. Background Art

Current superscaler processors, such as a microprocessor, perform techniques such as branch prediction and out-of-order execution to enhance performance. Processors having out-of-order execution pipelines execute certain instructions in a different order than the order in which the instructions were fetched and decoded. Instructions may be executed out of order with respect to instructions for which there are not dependencies. Out-of-order execution increases processor performance by preventing execution units from being idle merely because of program instruction order. Instruction results are reordered after execution.

The task of handling data dependencies is simplified by restricting instruction decode to being in-order. The processors may then identify how data flows from one instruction to subsequent instructions through registers. To ensure program correctness, registers are renamed and instructions wait in reservation stations until their input operands are generated, at which time they are issued to the appropriate functional units for execution. The register renamer, reservation stations, and related mechanisms link instructions having dependencies together so that a dependent instruction is not executed before the instruction on which it depends. Accordingly, such processors are limited by in-order fetch and decode.

When the instruction from the instruction cache misses or a branch is mispredicted, the processors have either to wait until the instruction block is fetched from the higher level cache or memory, or until the mispredicted branch is resolved, and the execution of the false path is reset. The result of such behavior is that independent instructions before and after instruction cache misses and mispredicted branches cannot be executed in parallel, although it may be correct to do so.

Multithreading processors such as shared resource multithreading processors and on-chip multiprocessor (MP) processors have the capability to process and execute multiple threads concurrently. The threads that these processors process and execute are independent of each other. For example, the threads are either from completely independent programs or are from the same program but are specially compiled to create threads without dependencies between threads. However, these processors do not have the ability to concurrently execute different threads from the same program that may have dependencies. The usefulness of the multithreading processors is thereby limited.

Accordingly, there is a need for multithreading processors that have the ability to concurrently execute different threads from the same program where there may be dependencies among the threads.

SUMMARY OF THE INVENTION

In one embodiment, a processor includes thread management logic including a thread predictor having state machines to indicate whether thread creation opportunities should be taken or not taken. The processor includes a predictor training mechanism to receive retired instructions and to identify potential threads from the retired instructions and to determine whether a potential thread of interest meets a test of thread goodness, and if the test is met, one of the state machines that is associated with the potential thread of interest is updated in a take direction, and if the test is not met, the state machine is updated in a not take direction.

The thread management logic may control creation of an actual thread and may further include reset logic to control whether the actual thread is reset and wherein if the actual thread is reset, one of the state machines associated with the actual thread is updated in a not take direction. The final retirement logic may control whether the actual thread is retired, and wherein if the actual thread is retired, the state machine associated with the actual thread is updated in a take direction.

The circuitry may be used in connection with a multithreading processor that detects speculation errors involving thread dependencies in execution of the actual threads and re-executes instructions associated with the speculation errors from trace buffers outside an execution pipeline.

BRIEF DESCRIPTION OF THE DRAWINGS

The invention will be understood more fully from the detailed description given below and from the accompanying drawings of embodiments of the invention which, however, should not be taken to limit the invention to the specific embodiments described, but are for explanation and understanding only.

FIGS. 14A, 14B, 14C, 14D, 14E, and 14E are graphical representations of predictor stacks according to one embodiment of the invention.

DETAILED DESCRIPTION OF PREFERRED EMBODIMENTS

A. System Overview

B. Thread Predictor and Training Mechanism

1. When an Actual Thread is Retired or Reset Without Retirement

2. When a Potential Thread does or does not Meet a Test of Thread Goodness

C. Additional Information and Embodments

Incorporation by Reference: Page 3, line 12 to page 37, line 30 and FIGS. 1–38 of U.S. application Ser. No. 08/992,375, filed Dec. 16, 1997, now pending, are incorporated into the present specification and drawings by reference. However, the present invention is not limited to use in connection with the various examples provided in U.S. application Ser. No. 08/992,375.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Figure 1:
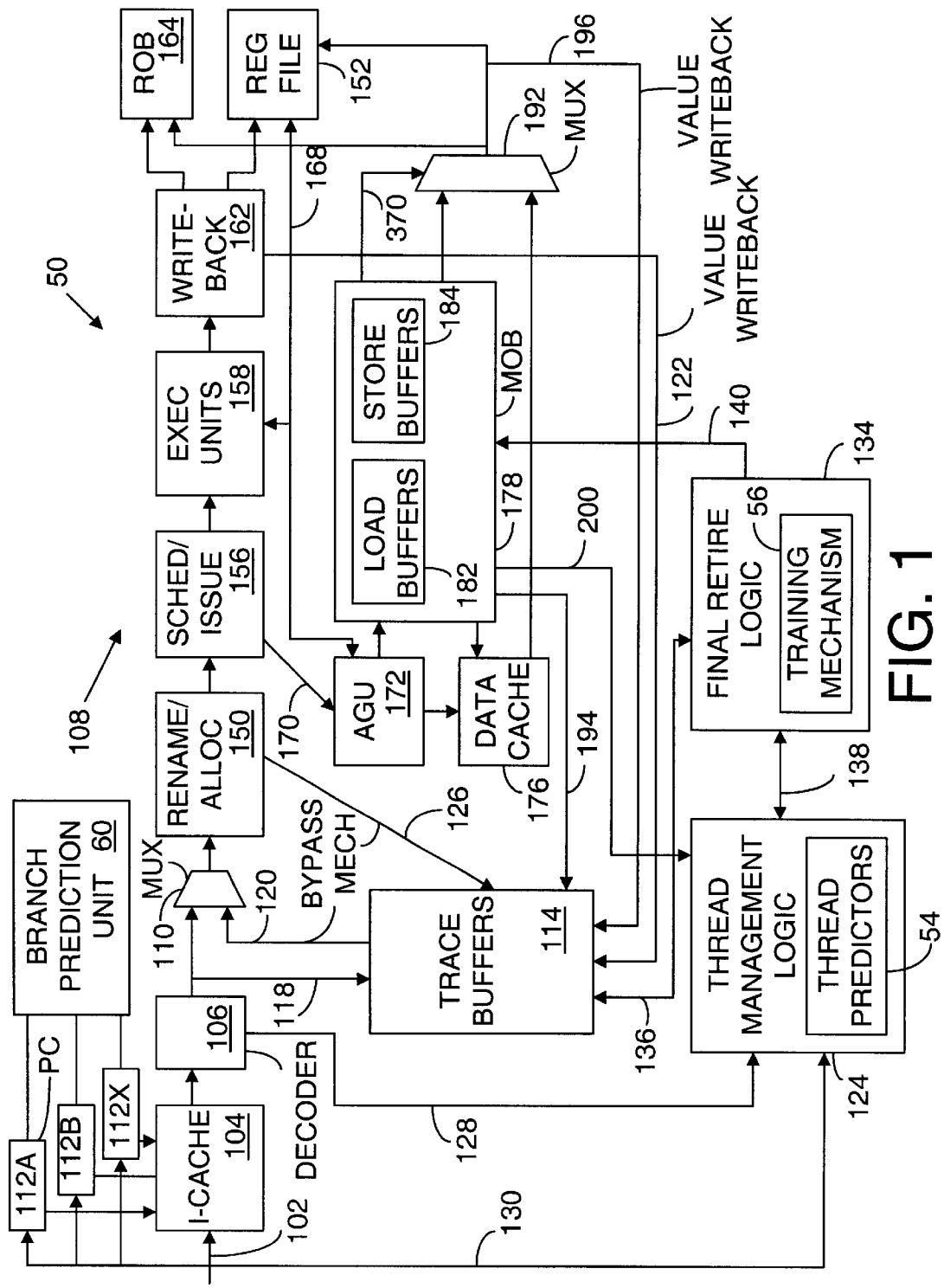
FIG. 1 is a block diagram of a processor according to one embodiment of the invention.

Referring to FIG. 1, a processor 50 includes an execution pipeline 108 in which instructions may be executed speculatively. Examples of the speculation include data speculation and dependency speculation. Any of a wide variety of speculations may be involved. Processor 50 includes mechanisms, including in trace buffer 114, to detect speculation errors (misspeculations) and to recover from them. When a misspeculation is detected, the misspeculated instruction is provided to execution pipeline 108 from trace buffers 114 through conductors 120 and is replayed in execution pipeline 108. If an instruction is "replayed," the instruction and all instructions dependent on the instruction are re-executed, although not necessarily simultaneously. If an instruction is "replayed in full," the instruction and all instructions following the instruction in program order are re-executed. The program order is the order the instructions would be executed in an in order processor. When it is determined that an instruction should be replayed, instructions which are directly or indirectly dependent on that instruction are also replayed. The number of re-executions of instructions can be controlled by controlling the events which trigger replays. In general, the term execute may include original execution and re-execution. Results of at least part of the instructions are provided to the trace buffers. Final retirement logic 134 finally retires instructions in trace buffers 114 after it is assured that the instructions were correctly executed either originally or in re-execution. The invention is not restricted to any particular execution pipeline. For example, although professor 50 is an out-of-order processor for intra-thread execution, the invention could be used with an in order processor for intra-thread execution. Execution pipeline 108 may be any of a wide variety execution pipelines and may be a section of a larger pipeline. Execution pipeline 108 may be used in connection with a wide variety of processors.

As examples, the following describes certain processors in which the prediction and training circuitry of the present invention may be included. However, the invention is not restricted to use in such processors.

A. System Overview

1. Creation of Threads and Overview of Pipeline

Instructions are provided through conductors 102 to an instruction cache (I-cache) 104. A decoder 106 is illustrated as receiving instructions from I-cache 104, but alternatively could decode instructions before they reach I-cache 104. Depending on the context and implementation chosen, the term "instructions" may include macro-operations (macro-op), micro-operations (uops), or some other form of instructions. Any of a variety of instruction sets may be used including, but not limited to, reduced instruction set computing (RISC) or complex instruction set computing (CISC) instructions. Further, decoder 106 may decode CISC instructions to RISC instructions. Instructions from I-cache 104 are provided to pipeline 108 through MUX 110 and to trace buffers 114 through conductors 118.

A trace is a set of instructions. A thread includes the trace and related signals such as register values and program counter values.

Thread management logic 124 creates different threads from a program or process in I-cache 104 by providing starting counts to program counters 112A, 112B, . . . , 112X, through conductors 130 (where X represents the number of program counters). As an example, X may be 4 or more or less. Thread management logic 124 also ends threads by stopping the associated program counter. Thread management logic 124 may cause the program counter to then begin another thread. Portions of different threads may be concurrently read from I-cache 104.

To determine where in a program or process to create a thread, thread management logic 124 may read instructions from decoder 106 through conductors 128. The threads may include instructions inserted by a programmer or compiler that expressly demarcate the beginning and ending of threads. Alternatively, thread management logic 124 may analyze instructions of the program or process to break up a program or process supplied to I-cache 104 into different threads. For example, branches, loops, backward branches, returns, jumps, procedure calls, and function calls may be good points to separate threads. Thread management logic 124 may consider the length of a potential thread, how many variables are involved, the number of variables that are common between successive threads, and other factors in considering where to start a thread. Thread management logic 124 may consider the program order in determining the boundaries of threads. The program order is the order the threads and the instructions within the threads would be executed on an in order processor. The instructions within the threads may be executed out of order (contrary to program order). The threads may be treated essentially independently by pipeline 108. Thread management logic 124 may include a prediction mechanism including a history table to avoid making less than optimal choices. For example, thread management logic 124 may create a thread and then later determine that the thread was not actually part of the program order. In that case, if the same code is encountered again, the prediction mechanism could be used to determine whether to create that same thread again.

Dynamically creating threads is creating threads from a program that was not especially written or compiled for multithreading, wherein at least one of the threads is dependent on another of the threads. The program may originate from off a chip that includes execution pipeline 108 and thread management logic 124. Dynamically creating the threads, executing the threads, and detecting and correcting speculation errors in the execution is referred to as dynamic multithreading.

Thread management logic 124 may use a combination of dynamic creation of threads and use of express instruction hints from a compiler or programmer. Thread management logic 124 would ordinarily create threads dynamically. However, the express instruction hints could be used occasionally. One way in which they may be used is in connection with if-then-else code in which a thread could be created beginning with the code following the conclusion of the else statement. It would take considerable complexity for thread management logic 124 to look forward to these instructions, but can be done in a compiler.

An advantage of using both a compiler and hardware for multithreading is that the compiler does not have to be conservative. If only the compiler does multithreading, the compiler must be conservative to handle worst cases. If the hardware assists the compiler, the compiler can be more aggressive because the hardware will detect and replay instructions associated with an error such as misspeculation.

Figure 2:
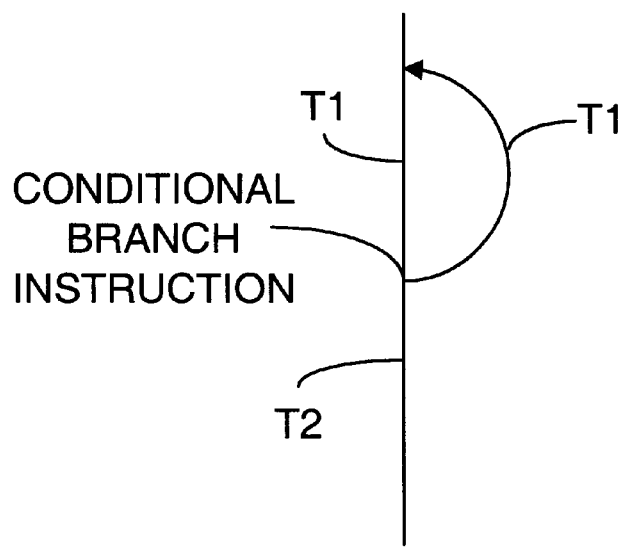
FIG. 2 is a flow diagram of an example of two threads.

FIG. 2 illustrates a thread T1 that includes a conditional backward branch instruction. In program order, thread T2 is executed following the conditional branch instruction when the branch is not taken. In time order, thread T2 is executed speculatively beginning at the time thread T1 first reaches the conditional branch instruction. Therefore, portions of thread T1 and T2 are executed concurrently. If thread T2 involves misspeculations, the effected instructions of thread T2 are replayed. Thread management logic 124 may monitor the count of the program counters through conductors 130. A purpose of monitoring the count is to determine when a thread should end. For example, when the condition of the conditional branch is not met, if the program counter of thread T1 were allowed to continue, it would advance to the first instruction of thread T2. Therefore, thread management logic 124 stops the program counter of thread T1 when the condition is not met.

Figure 3:
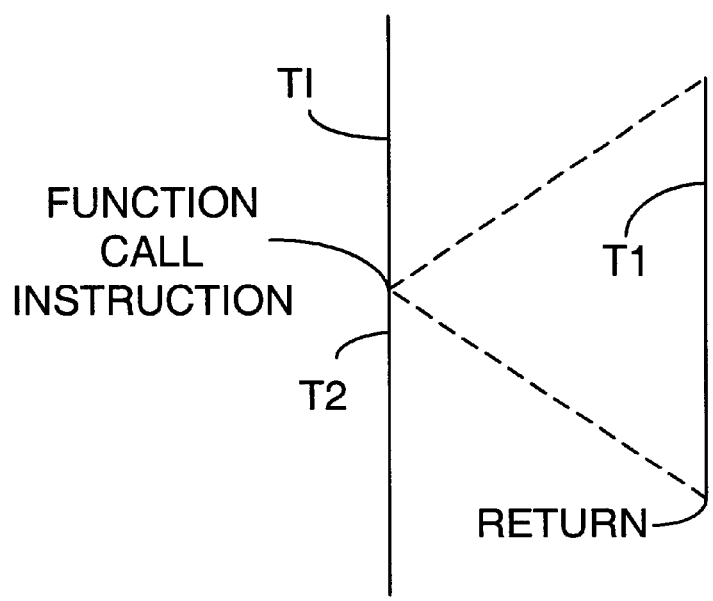
FIG. 3 is a flow diagram of another example of two threads.

FIG. 3 illustrates a thread T1 that includes a function call instruction. In program order, when the call instruction is reached, the program counter jumps to the location of the function and executes until a return instruction, at which time the program counter returns to the instruction after the call. In program order, thread T2 begins at the instruction following the return. In time order, thread T2 is executed speculatively beginning at the time thread T1 first reaches the call. If thread T2 involves misspeculations, the effected instructions of thread T2 are replayed. Thread T1 ends when its program counter reaches the first instruction of thread T2.

Figure 4:
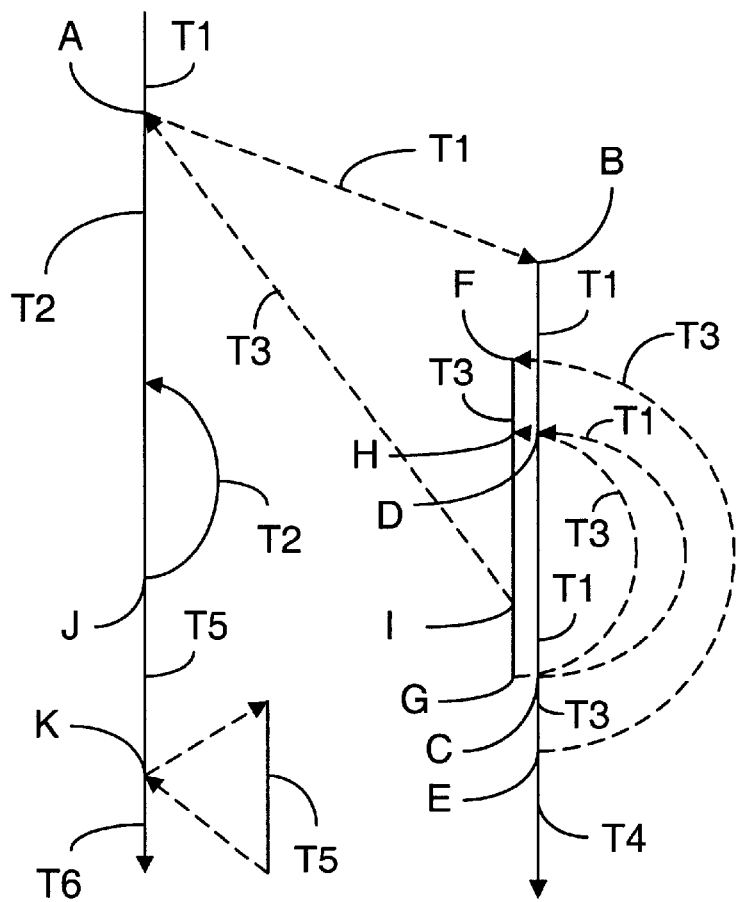
FIG. 4 is a flow diagram of an example of six threads.

FIG. 4 illustrates threads T1, T2, T3, and T4 which are part of a section of a program. Different program counters produce threads T1, T2, T3, and T4. Thread T1 includes Instructions to point A (function call instruction) and then from point B, to point C (conditional backward branch instruction), to point D and to point C again (the loop may be repeated several times). Thread T2 begins at the instruction that in program order is immediately after the return instruction of the function that is called at point A. Thread T3 begins at the fall through instruction in memory following the conditional backward branch of point C and continues to point E, to point F, to point G, to point H, and to point I, which is a return instruction to the instruction immediately following point A where thread T2 begins. Thread T4 begins at the fall through instruction in memory following the conditional backward branch at point E. Thread T5 starts following a backward branch instruction at point J and thread T6 starts following a function call at point K. It is assumed that there are only four trace buffers.

Figure 5:
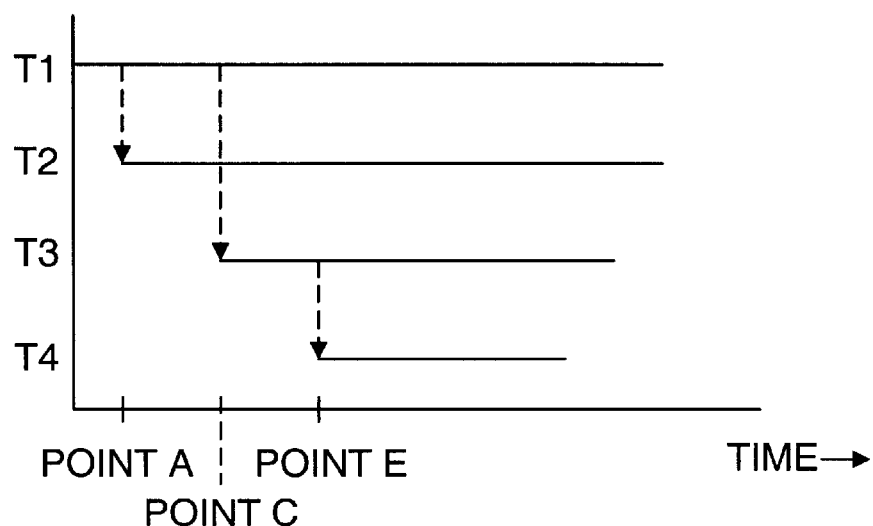
FIG. 5 is a graph showing overlapping execution of the threads of FIG. 6.

As illustrated in FIG. 5, portions of threads T1, T2, T3, and T4 are fetched, decoded, and executed concurrently. The threads are fetched, decoded, and executed out of order because the program order is not followed. In time order, execution of threads T2, T3, and T4 begins immediately following instructions at points A, C, and E, respectively. The vertical dashed lines show a parent-child relationship. Threads T2, T3, and T4 are executed speculatively by relying on data in registers and/or memory locations before it is certain that the data is correct. Processor 50 has mechanisms to detect misspeculation and cause misspeculated instructions to be replayed. It turns out that thread T4 is not part of the program order. Thread T4 may be executed until thread management logic 124 determines that thread T4 is not part of the program order. At that time, thread T4 may be reset without retirement under the control of reset logic 68 in thread management logic 124 and the resources that held or processed thread T4 in processor 50 may be deallocated and then allocated for another thread. In program order, threads T1, T2, and T3 would be executed as follows: first thread T1, then thread T3, and then thread T2.

Referring to FIG. 1, instructions from MUX 110 are received by rename/allocate unit 150 which provides a physical register identification (PRID) of the renamed physical register in register file 152. The PRID is provided to trace buffer 114 through bypass conductors 126. Allocation involves assigning registers to the instructions and assigning entries of the reservation stations of schedule/issue unit 156. Once the operands are ready for a particular instruction in the reservation stations, the instruction is issued to one of the execution units (e.g., integer, floating point) of execution units 158 or a memory execution pipeline which includes address generation unit (AGU) 172, memory order buffer (MOB) 178 (including load buffers 182 (one for each active thread) and store buffers 184 (one for each active thread)) and data cache 176. Depending on the instructions, operands may be provided from register file 152 through conductors 168. Under one embodiment of the invention, dependent instructions within a thread may be so linked that they are not executed out-of-order. However, dependent instructions from different threads may be concurrently fetched, decoded, and executed out-of-order.

For high performance, reservation stations and related mechanisms are designed to have both low latency and high bandwidth issue of instructions. The latency and bandwidth requirements place restrictions on the number of instructions that can be waiting in the reservation stations. By positioning trace buffers 114 outside pipeline 108, a large number of instructions can be available for execution/replay without significantly decreasing throughput of pipeline 108. The effect of latency between execution pipeline 108 and trace buffers 114 can be reduced through pipelining.

The result of an execution and related information are written back from the memory through MUX 192 and conductors 196 (in the case of loads) and from writeback unit 162 through conductors 122 (in the case of other instructions) to trace buffers 114. The results and related information may also be written to register file 152 and associated re-order buffer (ROB) 164. Once the result and information of an instruction are written to register file 152 and ROB 164, the instruction is retired in order as far as pipeline 108 is concerned. This retirement is called a first level or initial retirement. At or before the first level retirement, resources for the retired instruction in schedule/issue unit 156 including the reservation stations, register file 152, and ROB 164 are deallocated. However, all needed details regarding the instruction are maintained in trace buffers 114 and MOB 178 until a final retirement, described below.

A dependency exists between a later thread and an earlier thread when in program order, data used in the later thread is produced in the earlier thread. The data may have been produced in the earlier thread through a memory or non-memory instruction. For example, the later thread may be dependent on the earlier thread if a load instruction in the later thread has the same address as a store instruction in the earlier thread. The later thread may also be dependent on the earlier thread if an instruction in the later thread involves a register that was modified in the earlier thread. Likewise, a later instruction is dependent on an earlier instruction when in program order the later instruction uses data produced by the earlier instruction. The word "dependency" is also used in the phrase "dependency speculation." An example of a dependency speculation is speculating that there is no dependency between a load instruction and an earlier store instruction. Address matching is an example of a technique for checking for dependency speculation errors. An example of data speculation is speculating that the data in a register is the correct data. Register matching is an example of a technique for checking for data speculation errors.

Figure 6:
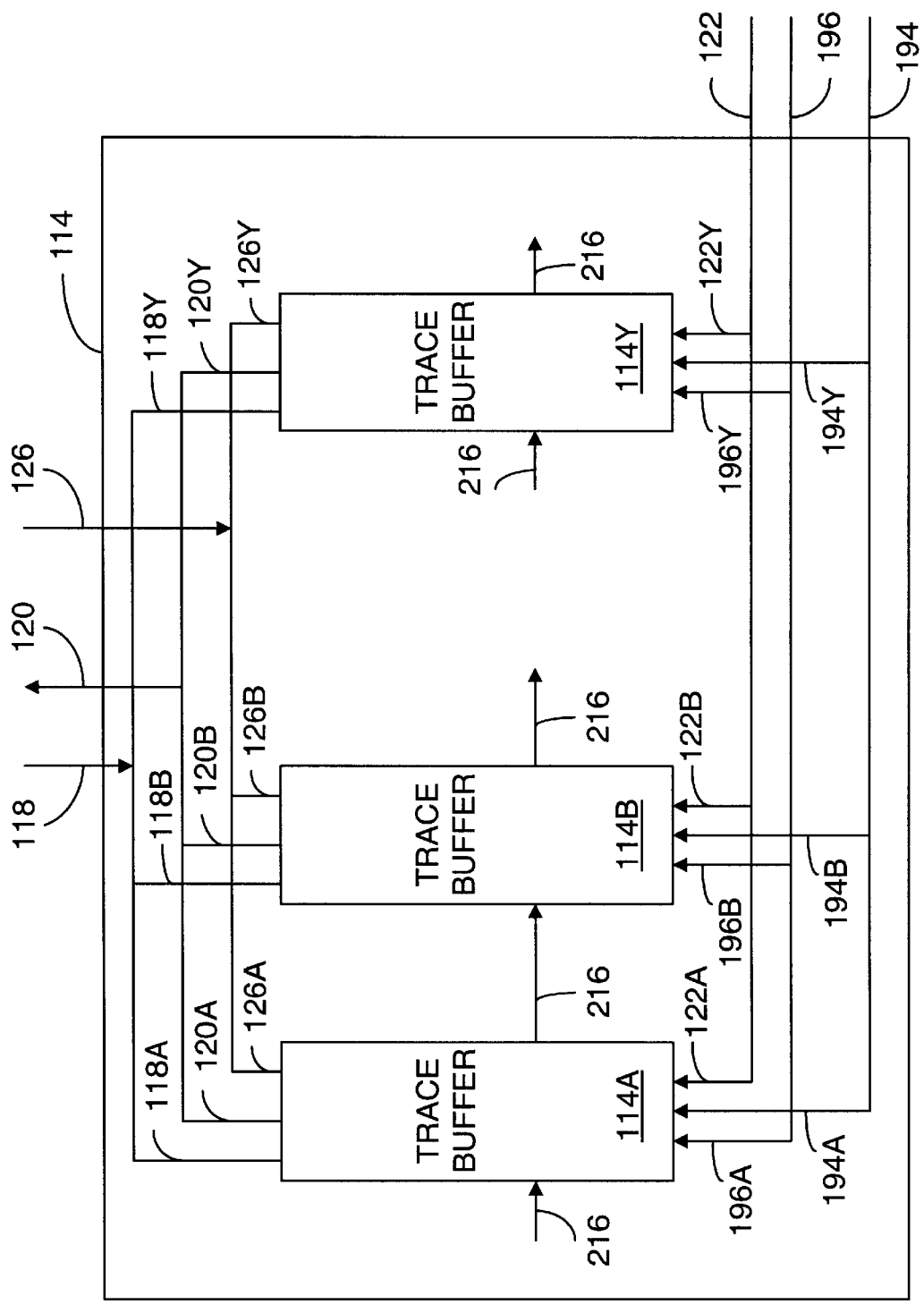
FIG. 6 is a block diagram illustrating individual trace buffers according to one embodiment of the invention.

Referring to FIG. 6, trace buffers 114 include trace buffers 114A, 114B, 114C, . . . , 114Y, where Y presents the number of trace buffers. For example, if Y=4(i.e., Y=D), there are 4 trace buffers. If Y is less than 3, trace buffers 114 does not include all the trace buffers shown in FIG. 6. Y may be the same as or different than X (the number of program counters). Trace buffers 114 may be a single memory divided into individual trace buffers, or physically separate trace buffers, or some combination of the two.

Referring to FIG. 6, trace buffers 114A, 114B, . . . , 114Y receive instructions through conductors 118A, 118B, . . . 118Y, which are connected to conductors 118. There may be demultiplexing circuitry between conductors 118A, 118B, . . . , 118Y and conductors 118. Alternatively, enable signals may control which trace buffer is activated. Still alternatively, there may be enough parallel conductors to handle parallel transactions. Trace buffers 114A, 114B, . . . , 114Y supply instructions and related information for replay to pipeline 108 through conductors 120A, 120B, . . . 120Y, which are connected to conductors 120. It is noted that multiple instructions from trace buffers 114 may concurrently pass through conductors 120 and MUX 110 for re-execution. At the same time, multiple instructions from decoder 106 may also pass through MUX 110 for the first time. A thread ID and instruction ID (instr ID) accompany each instruction through the pipeline. A replay count may also accompany the instruction. In the case of load and store instructions, a load buffer ID (LBID) and a store buffer ID (SBID) may also accompany the instruction. In one embodiment, the LBID and SBID accompany every instruction, although the LBID and SBID values may be meaningless in the case of instructions which are not loads or stores. As described below, a PRID or value may also accompany an instruction being re-executed.

Trace buffers 114A, 114B, . . . , 114Y receive PRID, LBID, and SBID values from rename/allocate unit 150 through bypass conductors 126A, 126B, . . . 126Y, which are connected to conductors 126. Trace buffers 114A, 114B, . . . , 114Y receive writeback result information and related signals through conductors 122A, 122B, . . . , 122Y, which are connected to conductors 122, and through conductors 196A, 196B, . . . , 196Y, which are connected to conductors 196. Replay signals are provided through conductors 194A, 194B, . . . , 194Y, which are connected to conductors 194. Multiplexing and/or enable circuitry and/or a substantial number of parallel conductors may be used in conductors 120, 126, 122, 194, and 196. The trace buffers are not necessarily identical.

2. Misspeculation Detection Circuitry

The following provides examples of misspeculation detection circuitry, but the invention is not limited to use with such detection circuitry. Trace buffers 114 include detection circuitry to detect certain speculation errors. According to one embodiment of the invention, each trace buffer has an output register file that holds the register context of the associated thread and an input register file to receive the register context of the parent thread output register. The register context is the contents or state of the logical registers. The contents of the output register file is updated often, perhaps each time there is a change in a register. The contents of the input register file is initialized when a thread is created and updated only after a comparison, described below.

An output register file and input register file may include a Value or PRID field and a status field. The status field indicates whether a valid value or a valid PRID is held in the Value or PRID field. A comparator compares the contents of input register file (in trace buffer 114B) for a current thread with the contents of output registers for an immediately preceding thread in program order. The comparison can be made at the end of the execution of the immediately preceding thread or during the execution of the preceding thread. The comparison is also made at the end of the retirement of the preceding thread. In one embodiment, the comparison is only made at the end of the retirement of the preceding thread. In another embodiment, the comparison is also made at intermediate times. In other embodiments, the comparison is made continuously during final retirement of the preceding thread.

Various events could trigger a comparison by the comparator. The comparison is made to detect speculation errors. If there is a difference between the speculative input register 9 file and the output register file from the preceding thread, values of one or more output registers of the immediately preceding thread have changed and a replay is triggered. Trace buffer 114B causes the effected instructions to be replayed with the changed register values. There is no guarantee the changed values are the ultimately correct values (i.e., the values that would have been produced in an in order processor). The instructions may need to be replayed again, perhaps several times.

When replay triggering logic determines that a source operand (or other input value) has been mispredicted, it triggers the corresponding trace buffer (such as trace buffer 114B) to dispatch those instructions that are directly or indirectly dependent on the mispredicted source operand to be replayed in pipeline 108.

In one embodiment, an algorithm that identifies dependent instructions in a way that is similar to register renaming. Instead of a mapping table, a dependency table is used. The table contains a flag for each logical register that indicates if the register depends on the mispredicted value. At the start of a recovery sequence, the flag corresponding to each mispredicted register is set. The dependency table is checked as instructions are read from the trace buffer. If one of the source operand flags is set, an instruction depends on the mispredicted value. The instruction is selected for recovery dispatch and its destination register flag is set in the table. Otherwise, the destination register flag is cleared. Only the table output for the most significant instruction within the block can be relied upon all the time. Subsequent instructions may depend on instructions ahead of them within the block. A bypass at the table output is needed to handle internal block dependencies. If the dependency table reaches a state during the recovery sequence in which all the dependency flags are clear, the recovery sequence is terminated.

The identified instructions are dispatched from the trace buffer for execution in the order the instructions exist in the trace buffer (which is the program order). However, the instructions may be executed out of order under the control of schedule/issue unit 156, as in any out-of-order processor. Control bits are appended to the instruction dispatched from the trace buffer to indicate to rename/allocate unit 150 whether to (1) do register renaming, (2) bypass the rename alias table lookup in rename/allocate unit 150 and instead use the PRID from the corresponding trace buffer, or (3) bypass renaming completely and use the value from the trace buffer as if it where a constant operand in the instruction.

3. Information Regarding Thread Management Logic and Final Retirement

The following are some details regarding thread management logic and final retirement that may be used in connection with some embodiment of the invention. However, the invention is not limited to such details. In one embodiment, thread management logic 124 uses a tree structure (such as tree structure 58 in FIG. 7) to keep track of thread order. Under the tree structure, the program order (which is also the retirement order) flows from top to bottom, and a node on the right is earlier in program order than a node on the left. A root is the first in program order. A tree is an abstract idea, whereas a tree structure is circuitry that implements the tree.

Figure 8A:
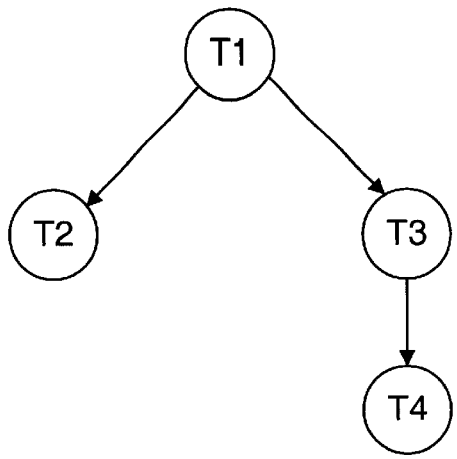
FIG. 8A, 8B, 8C, and 8D illustrates trees to organize thread relationships of FIG. 4.
Figure 8B:
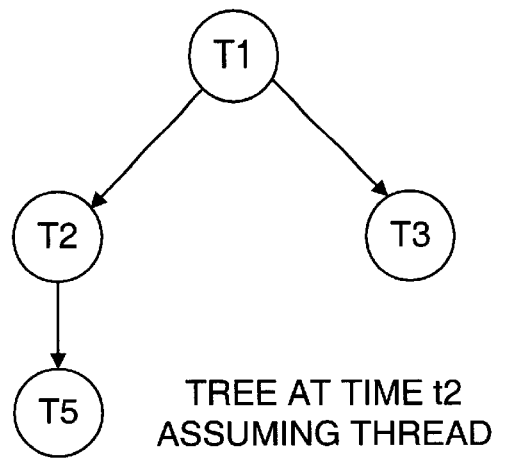
Figure 8C:
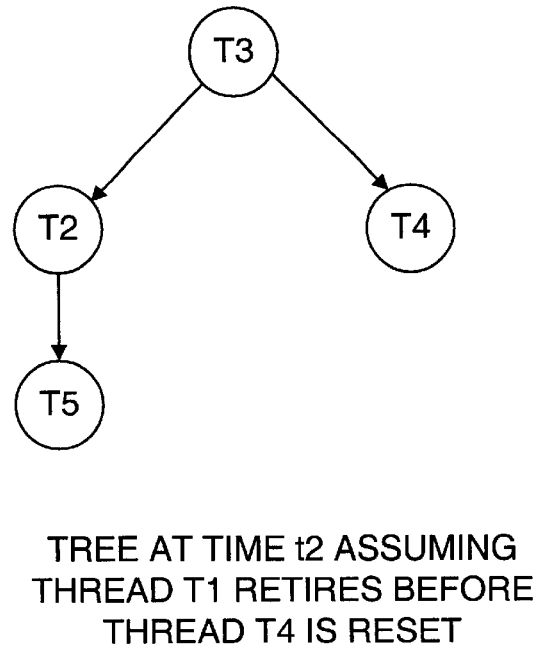
Figure 8D:
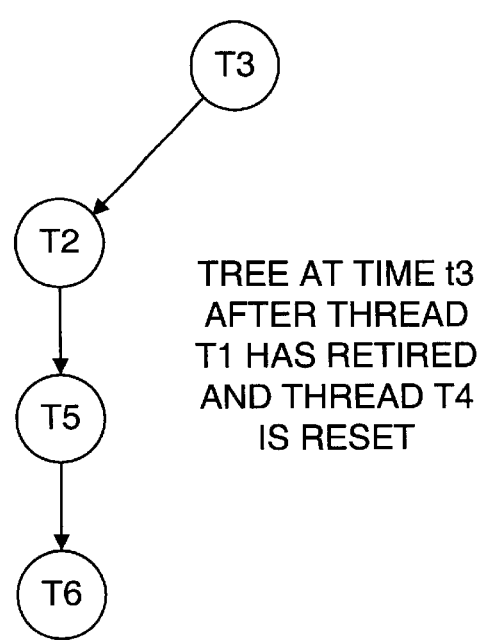

For example, FIGS. 8A, 8B, 8C, and 8D illustrate trees structures for threads of FIG. 4 at different times. FIG. 8A illustrates the tree structure at time t1. Thread T2 is added to the tree before thread T3 is added to the tree. Thread T4 is added to the tree after thread T3 is added to the tree. Threads T2 and T3 are children of thread T1. Thread T4 is a child of thread T3. Following the rules of top to bottom and right to left, the program and retirement orders are thread T1, T3, T4, and T2. FIG. 8B illustrates the tree structure at time t2 assuming that thread T4 is reset before thread T1 retires. The program and retirement orders are thread T1, T3, T2, and T5. FIG. 8C illustrates the tree structure at time t2 assuming that thread T1 retires before thread T4 is reset. The program and retirement orders are thread T3, T4, T2, and T5. FIG. 8D illustrates the tree structure at time t3, which is after the time thread T1 retires and thread T4 is reset. The program and retirement orders are T3, T2, T5 and T6.

Threads begin at the instruction following a backward branch or a function call. That is, threads begin at the next instruction assuming the backward branch were not taken or the function was not called (as illustrated by threads T2 in FIGS. 2 and 3). In so doing, from the perspective of a thread (node), the program order of children nodes of the thread are in the reverse of the order in which the threads were started (created).

In one embodiment, three events may cause a thread to be removed from the tree: (1) A thread at the root of the tree is removed when the thread is retired. When the thread at the root is retired, the thread (node) that is next in program order becomes the root and nodes are reassigned accordingly. (2) A thread that is last in program order is removed from the tree to make room for a thread higher in program order to be added to the tree. In this respect, the tree acts as a last-in-first-out (LIFO) stack. (3) A thread may be reset and thereby removed from the tree when it is discovered that the program counter of its parent thread is outside a range between a start count and an end count.

An instruction is finally retired from trace buffer 114 when all the instructions for all previous threads have retired and all replay events that belong to the instruction have been serviced. Stated another way, an instruction is finally retired when it can be assured that the instruction has been executed with the correct source operand. Threads are retired in order. For example, an instruction in thread X cannot be retired until all the previous threads have been retired (i.e., the instructions of all the previous threads have been retired). The instructions within a thread are retired in order, although instructions that are all ready for retirement may be retired simultaneously.

Final retirement is controlled by final retirement logic 134. In one embodiment of the invention, final retirement includes (1) commitment of results to in order register file, (2) service interrupts, exceptions, and/or branch mispredictions; (3) deallocation of trace buffer and MOB 178 resource entries; and (4) signaling the MOB to mark stores as retired and to issue then to memory. Deallocating entries may involve moving a head pointer. Store instructions in MOB 178 are not deallocated until after it is certain that associated data is copied to data cache 176 or other memory.

4. Memory Order Buffer

The invention is not limited to any particular type of memory order buffer (MOB). However, to the extent load and store instructions are executed speculatively, there should be a mechanism to detect misspeculations and to allow for replay of effected instructions. For example, there may be a mechanism to detect when a load is made from a memory location before a store to the same location (which occurred earlier in program order but later in time order). For example, MOB 178 includes a MOB for each thread, where each MOB includes a load buffer arid store buffer to hold copies of load and store instructions of the traces in trace buffers 114A, 114B, ..., 114Y, respectively. Replay conductors 194 provide signals from MOB 178 to trace buffers 114 alerting trace buffers 114 that a load instruction should be replayed. To ensure ultimate correctness of execution, MOB 178 includes mechanisms to ensure memory data coherency between threads.

B. Thread Predictor and Training Mechanism

Figure 7:
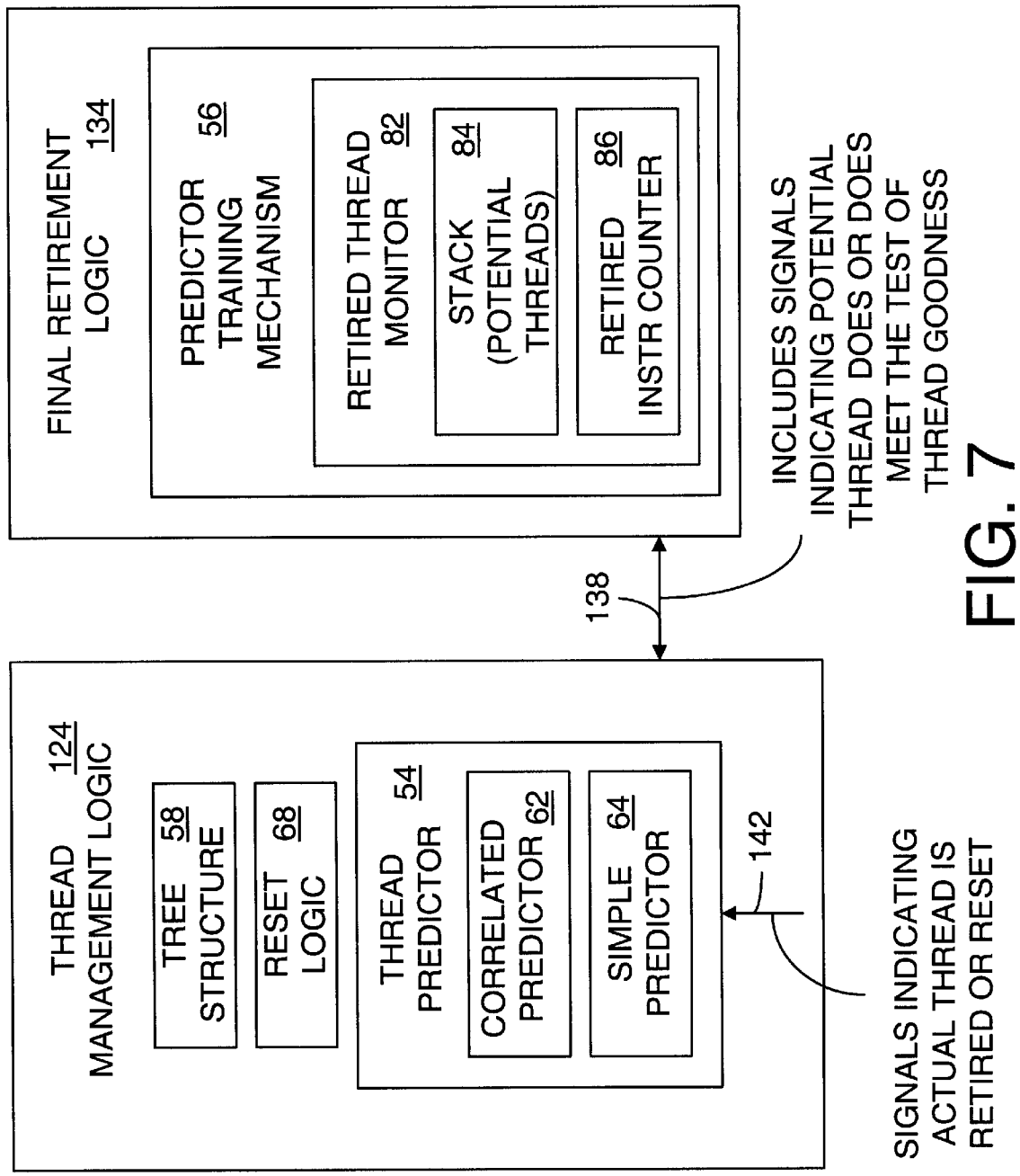
FIG. 7 is a block diagram of a details of certain components of the thread management logic and final retirement logic of FIG. 1 according to one embodiment of the invention.

Referring to FIGS. 1 and 7, processor 50 includes thread predictor 54 to make predictions regarding whether a thread should be created in response to reception of a thread spawning opportunity instruction. Examples of spawning opportunity instructions include function calls, backward branches for loops, and compiler inserted instructions suggesting or mandating spawning of a thread. (Spawning a thread means creating a thread.) Thread predictor 54 is used by thread management logic to increase the likelihood that executed threads will retire. The invention also includes a training mechanism 56 to train thread predictor 54 to help decrease the probability that thread management logic 124 will create threads that have relatively few instructions or relatively little overlap with the spawning thread (the thread with the spawning opportunity instruction). These predictions help increase processor performance.

The following terminology is used with respect to one embodiment of the invention. An actual thread is a thread that is created through a program counter and executed at least in part. An actual thread is either retired or reset without retirement. A thread creation opportunity is an opportunity to create an actual thread. Thread management logic 124 decides whether or not to take the thread creation opportunity and create an actual thread in response to detecting a spawning opportunity instruction from decoder 106 (or from other circuitry). A potential thread is a group of retired instructions analyzed in a predictor training mechanism. The potential thread is associated with a retired spawning opportunity instruction. The set of instructions included in a potential thread may or may not correspond exactly to a set of instructions in a recently retired actual thread. Although the specification does not always explicitly identify a thread as being actual or potential, it is clear from the context.

Figure 9:
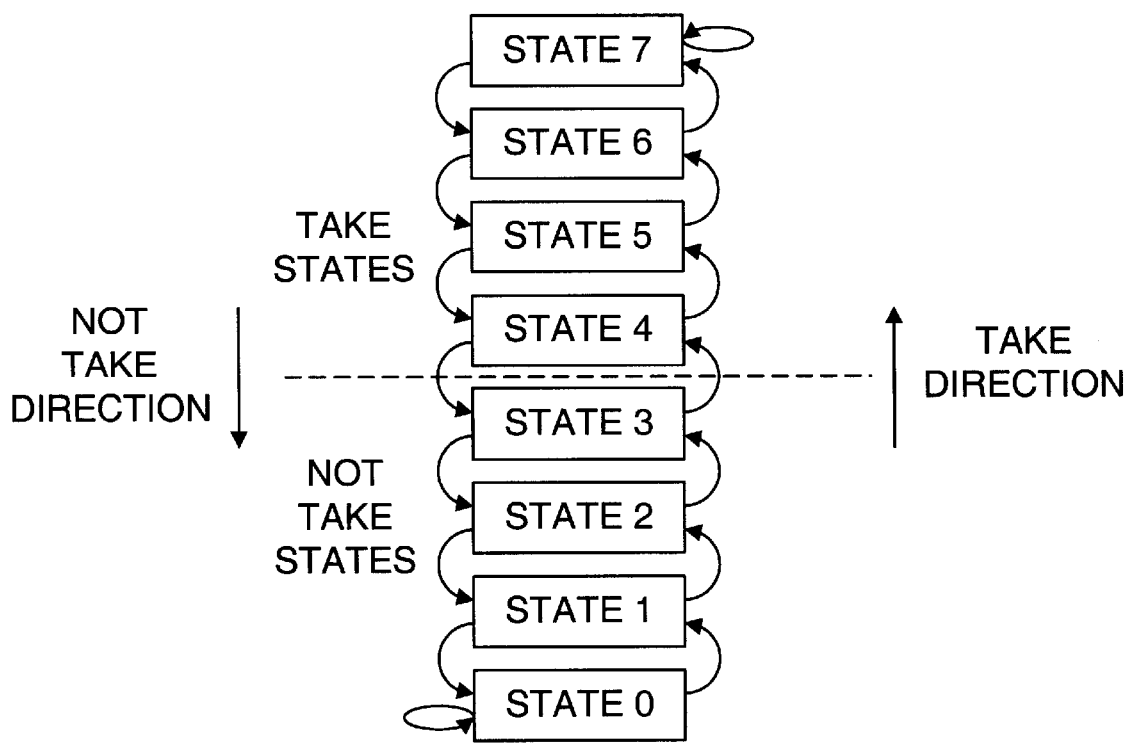
FIG. 9 illustrates states of a state machine.

Thread predictor 54 includes numerous state machines corresponding to different spawning opportunity instructions. (In some embodiments, more than one state machine may correspond to the same spawning opportunity instruction, such with the correlated predictor described below.) The state machines may share some circuitry in common. FIG. 9 illustrates states 0, 1, 2, . . . , 7 of state machine. As an example, states 0–3 may be not take states and states 4–7 may be take states (although the number of take and not take states do not have to be equal). A take state means a thread creation opportunity is to be taken and a not take state means the thread creation opportunity is not to be taken. When the state machine is updated in the take direction, the state changes from a lower to a higher state, unless the state is already at state 7, in which case it remains at state 7. When the state machine is updated in the not take direction, the state changes to from a higher to a lower state, unless the state is already at state 0, in which case it remains at state 0. Examples of updating in the take direction include state 0 to state 1, state 3 to state 4, and state 7 to State 7. Examples of updating in the not take direction includes state 6 to state 5, state 4 to state 3, and state 0 to state 0. As an example, if the state machine included three bit saturated counters, states 0–7 might be binary states "000," "001," "010," "011," "100," "101," "110," and "111," respectively A state machine are updated in response to two events (1) an actual thread is retired or reset without retirement or (2) a potential thread does or does not meet a test of thread goodness. If the state machine is a counter, updating may include increasing or decreasing a count. However, updating a state machine does not always result in a change of the state of the state machine (e.g., the state in a saturating counter state does not go above or below certain counts).

1. When an Actual Thread is Retired or Reset Without Retirement

When an actual thread is retired, that is evidence that the thread would retire again if it were created again in response to the same spawning opportunity instruction, particularly if it has the same thread lineage. The thread lineage of a thread of interest includes a parent thread and perhaps a grandparent thread. The parent thread is the thread containing the spawning opportunity instruction. The grandparent thread is the parent of the parent. The thread lineage is represented as address bits of the thread of interest, parent, and perhaps grandparent. However, not all the bits need be used (e.g., only part of the patent and grandparent bits might be used) and the bits that are used may be acted on by some function to help avoid aliasing with respect to the thread predictor.

In response to an actual thread retiring, a signal is provided to thread predictor 54 to update the state machine (e.g., incrementing the state of the state machine) to indicate a successfully taken thread creation opportunity. However, in general, there is no guarantee the thread would retire again if it were executed again. If a thread is reset, that is evidence that a thread would be reset again if it were created again, particularly if it has the same lineage. Accordingly, in response to an actual thread being reset, a signal is provided to thread predictor 54 to update the state machine (e.g., decrementing the state) to indicated a unsuccessfully taken thread creation opportunity. However, in general, there is no guarantee the thread would be reset if executed again.

Referring to FIG. 7, in one embodiment, thread predictor 54 includes a correlated predictor 62 and a simple predictor 64 (although in other embodiments only a correlated predictor or only a simple predictor might be used). The following provides details of specific examples of correlated and simple predictors. However, the invention may be implemented with different details.

Figure 10:
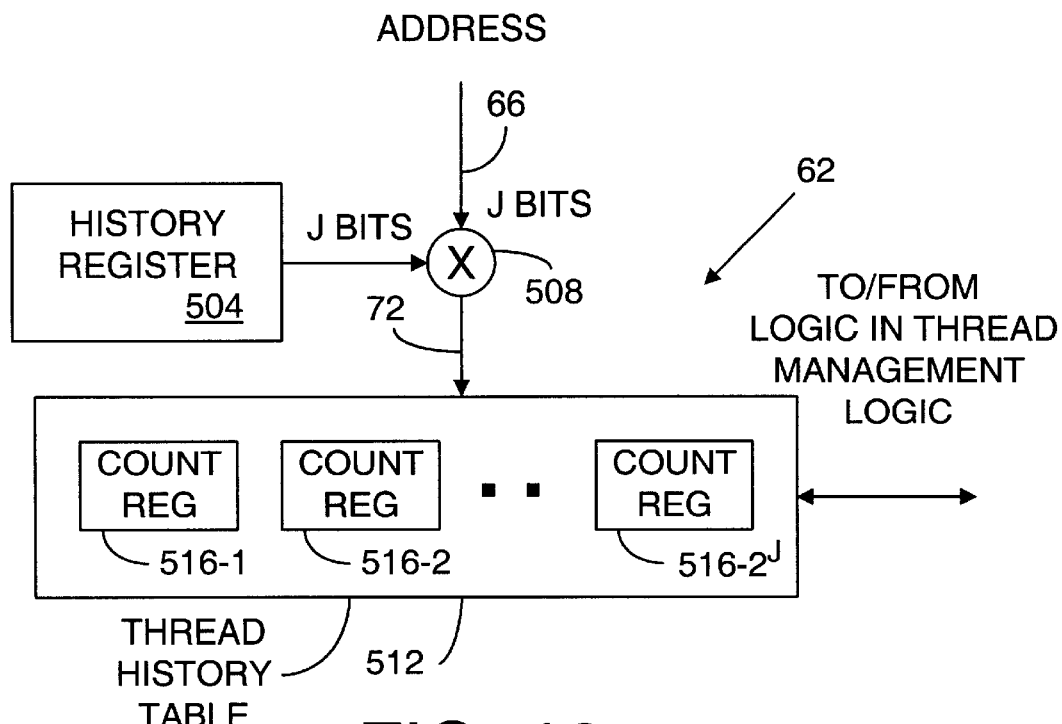
FIG. 10 is a correlated thread predictor according to one embodiment of the invention.

Correlated predictor 62 and/or simple predictor 64 are updated in response to an actual thread retiring or resetting and are updated in response to a potential thread meeting or not meeting a test of thread goodness. Correlated predictor 62 and/or simple predictor 64 are read in response to a thread creation opportunity being detected. Referring to FIG. 10, a correlated predictor 62 includes a thread history table 512 including $2^j$ count registers 516-1, 516-2, . . . 516-$2^j$, which may be part of finite state machines (e.g., up/down saturating counters). When a thread is retired or reset, a signal is provided on conductors 142 (as shown in FIG. 7) to update the state of correlated predictor 62 by updating the count in the count register that corresponds to the actual thread that is retired or reset. A read-modify-write approach may be used to update the value of the appropriate count register. Logic in thread management logic 124 controls updating and reading of states. When a spawning opportunity instruction is detected, thread management logic 124 reads the corresponding count register to determine whether or not to take the thread creation opportunity based at least in part on the state of correlated predictor. For example, if the count in the count register has one relationship (e.g., $>$ or $\geq$) to a threshold, correlated predictor 62 is in a "take state" and the actual thread is created. If the count has another relationship (e.g., $<$ or $\leq$) to the threshold, correlated predictor 62 is in a "riot take state" and an actual thread is not created. In one embodiment, even if the state is a "take state," thread management logic 124 will not cause a thread to be created if it means resetting a thread earlier in program order. In another embodiment, the thread will be created even if it means resetting a thread earlier in program order.

In one embodiment, a particular one of the count registers 516 of thread history table 512 is indexed through a signal on conductors 72, which is the result of an exclusive-OR (XOR) function 508. One input to XOR function 508 is the J least significant bits (LSBs) of an address on conductors 66 representing an actual thread (for updating a count register following retirement or reset), a potential thread (for updating a count register following a determination of whether a potential thread meets the test), or thread creation opportunity (for reading a count register), depending on the situation. The address provided to XOR function 508 does not necessarily have to be the first address of an actual thread, retired thread, or thread creation opportunity.

Another input is a thread lineage from history register 504. The bits in history register 504 may include some function of bits of the parent and grandparent of actual thread, potential thread, or thread creation opportunity. For example, the function may be the X LSBs from the first address of the parent and fewer LSBs from the first address of the grandparent thread of the thread creation opportunity, either concatenated or combined through, for example, an XOR function. In the case of a retired or reset actual thread, the thread lineage value for history register 504 may come from the tree structure. Each time a new thread is added to the tree structure, a thread lineage field associated with the tree structure can hold the thread lineage value associated with the thread. Then when the thread leaves the tree structure, the thread lineage value can be written into history register 504. In the case of a thread creation opportunity, the thread lineage value to be written into history register 504 can be determined from the address of the thread creation opportunity and the parent and perhaps grandparent in the tree structure. In the case of a potential thread, the thread lineage value to be written into history register 504 can be copied from a stack described below in connection with potential threads.

XOR function 508 is used to reduce the chances of aliasing in which the LSBs of the addresses of two thread creation opportunities and their parent and grandparent threads have similar values. An XOR function 508 does not have to be used. For example, the address of the thread creation opportunity could index a row and history register 504 could index a column of count registers. Various arrangements may be used.

A reason for using bits from the parent and grandparent threads is that there may be a correlation between the lineage of a thread creation opportunity and whether the thread creation opportunity will be retired if it is spawned.

Figure 11:
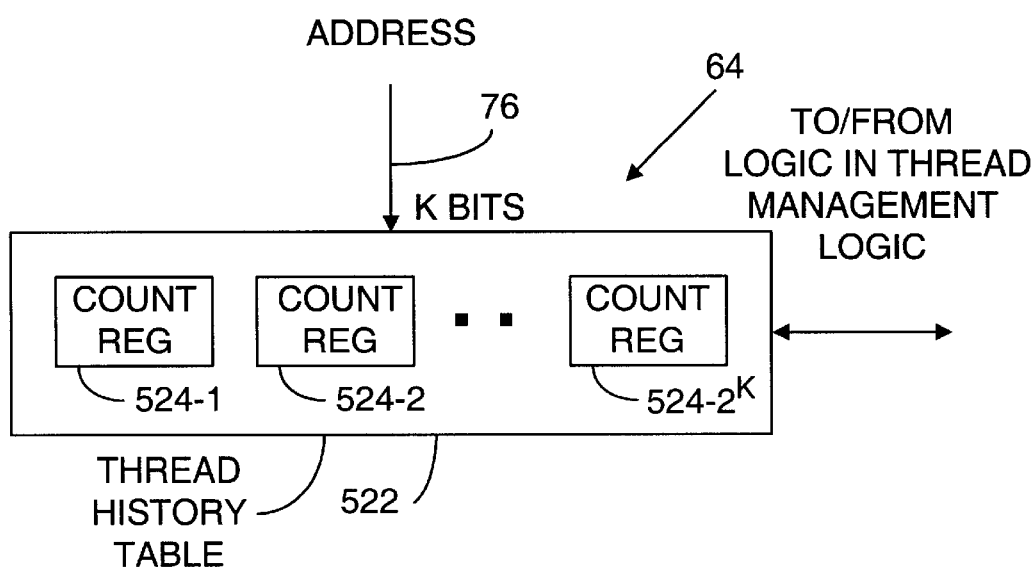
FIG. 11 is a simple thread predictor according to one embodiment of the invention.

Referring to FIG. 11, as an example, simple predictor 64 includes a thread history table 522 which includes $2^K$ count registers. (K may be equal to or different than J.) An address representing the actual thread, potential thread, or thread opportunity is received on conductors 76. The count registers are updated and read as described above in connection with the correlated predictor. Initially, thread management logic 124 might only consider the counts of simple predictor 64. Logic in thread management logic 124 controls updating and reading of simple predictor 64 and decides whether to create a thread based at least in part on the state of simple predictor 64 (e.g., the counts in the appropriate count registers). Then, as counts of correlated predictor 62 become meaningful, the counts of simple predictor 64 might be ignored.

2. When a Potential Thread does or does not Meet a Test of Thread Goodness

When an actual thread is executed, it will be known whether the thread is retired or reset without retirement. However, when a thread creation opportunity is not taken, the retirement or resetting of the non-created thread cannot be observed. Nonetheless, predictor training mechanism 56 analyzes retired instructions to make a prediction of whether it would be a good use of processor resources to create an actual thread from a potential thread.

Referring to FIG. 7, in one embodiment, final retirement logic 134 includes predictor training mechanism 56 which provides signals indicating whether potential threads meet a test of thread goodness. If the test of thread goodness is met, correlated predictor 62 and/or simple predictor 64 of thread predictor 54 are updated in a take direction (e.g., the count is incremented unless it is already a maximum). If the test is not met, correlated predictor 62 and/or simple predictor 64 are updated in a not take direction (e.g., the count is decremented unless it is a minimum). Referring to FIGS. 10 and 11, in one embodiment, the address of a thread spawning opportunity instruction of the potential thread is used to index thread history tables 512 and 522. In the case of correlated predictor 62 in FIG. 11, the potential thread address is applied to an input to XOR function 508. History register 504 holds bits related to the lineage of the potential threads.

In one embodiment, a potential thread is not analyzed if it's spawning opportunity instruction is the spawning opportunity instruction of an actual thread that is retiring or has just retired. In another embodiment, the potential thread is analyzed even if its spawning opportunity instruction is the spawning opportunity instruction of an actual thread that is retiring or has recently retired. In such a case, thread predictor 54 might only be updated in response to either (1) retirement or resetting of the actual thread or (2) the potential thread meeting or not meeting the test of thread goodness, but not (1) and (2). In another embodiment, thread predictor 54 might be updated twice in response to both (1) and (2).

Predictor training mechanism 56 includes a retired thread monitor 82 to analyze retired instructions and to identify potential threads in the retired instructions in the same way that thread management logic 124 identifies thread creation opportunities in instructions. Predictor training mechanism 56 determines whether the potential threads meet a test of thread goodness.

In one embodiment, the test of thread goodness is met if certain criteria of thread goodness are met. Examples of such criteria include criteria (1), (2), and (3), described below. In another embodiment, there is only one criterion of thread goodness (e.g., criterion (1)) and the test is met if the criterion is met. In yet another embodiment, there are two criteria (which may include one or more of criteria (1), (2), and (3)), and the test is met if the two criteria are met. There may be more than three criteria. In still another embodiment, at least one but fewer than all of multiple criteria must be met for the test to be met. The test may change depending on circumstances.

Figure 12:
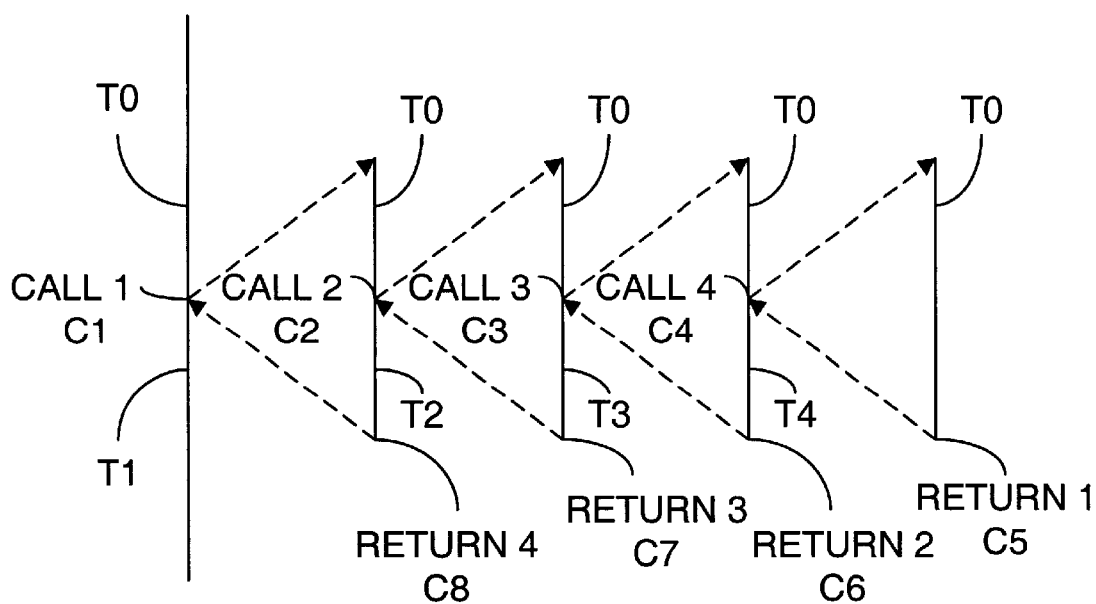
FIG. 12 illustrates nested procedures.
Figure 13:
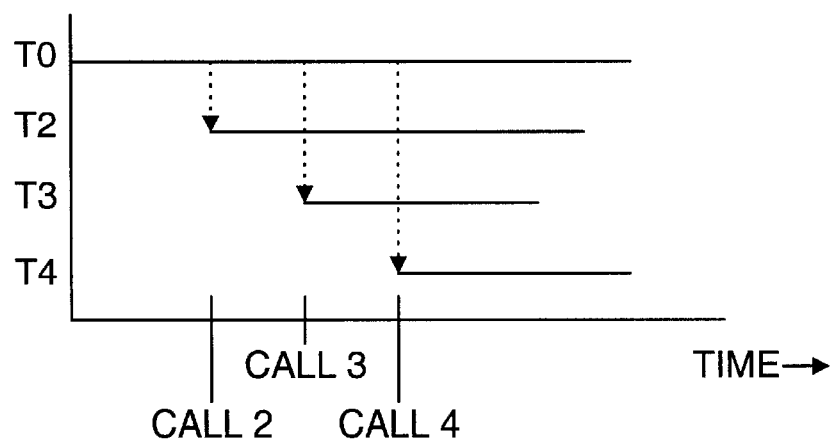
FIG. 13 is a graph illustrating execution of the actual threads corresponding to potential threads in FIG. 12.

FIG. 12 illustrates an example with which criteria (1), (2), and (3) may be described. FIG. 12 illustrates potential threads T0, T1, T2, T3, and T4 which include nested functions or procedures initiated by calls call 1, call 2, call 3, and call 4. It is assumed there are only four trace buffers 114A, 114B, 114C, and 114D in processor 50. The program and retirement order is T0, T4, T3, and T1. Without the predictor of the invention, the time order would be T0, T1, T2, T3 and then T1 would be reset to make room for T4. However, with the invention, it can be predicted that T1 would be reset (because it fails criterion (1) discussed below) so that if each of threads T0–T4 is actually created and the T1 thread creation opportunity instruction is predicted "not taken," in thread predictor 54, the time order would be T0, T2, T3, and T4. Referring to FIG. 13, in the example, thread T1 would not be created, but rather would be included as part thread T2.

A retired instruction counter 86 is incremented as instructions are retired. Table 1, below, lists the spawning opportunity instruction and joining opportunity instruction of threads T1–T4 and the count of instruction counter 86 at the instruction, where C1<C2<C3. . .<C8. In one embodiment, the joining opportunity instruction is the instruction of the previous potential thread in program order that joins with the potential thread of interest. For example, return 1 is the joining instruction of potential thread T4.

TABLE 1

| Thread | Spawning opportunity instruction | Count for spawning opportunity instruction | Joining opportunity instruction | Count for joining opportunity instruction |
| --- | --- | --- | --- | --- |
| T1 | call 1 | C1 | Return 4 | C8 |
| T2 | call 2 | C2 | Return 3 | C7 |
| T3 | call 3 | C3 | Return 2 | C6 |
| T4 | call 4 | C4 | Return 1 | C5 |

Criterion (1) Number of potential threads between spawn and join (stack depth) Criterion (1) concerns whether it would be likely that a potential thread, which is actually spawned, would be reset before retiring to make room for a thread earlier in program order. If so, the potential thread does not meet the criterion (1). Referring to FIGS. 7 and 14A–14F, a stack 84 may be used to keep track of a potential thread distance count. (Stack 84 is illustrated with only four entries., but may have more.) In one embodiment, stack 84 includes fields for a program counter (PC) value of the first address of the potential thread of interest; an indicia of the thread (e.g., T1); a distance count (dist cnt) which represents the number of intervening potential threads (note that the value changes as additional spawning opportunity instructions are received); a spawn count, which is the count of retired instruction counter 86 associated with the spawning opportunity instruction; and a join count, which is the count of retired instruction counter 86 associated with a joining opportunity instruction. Stack 84 may include others fields such as whether the spawning opportunity function is a call, backward branch, or special compiler instruction. A temporary register 144 holds the information regarding the potential thread most recently popped off stack 84. The thread lineage can be determined from the PCs of the potential thread of interest and its parent and perhaps grandparent or stack 84 may include a field (as part of, in addition to, or in place of the PC) to hold the thread lineage.

Figures 14A, 14B, 14C, 14D, 14E, 14F:
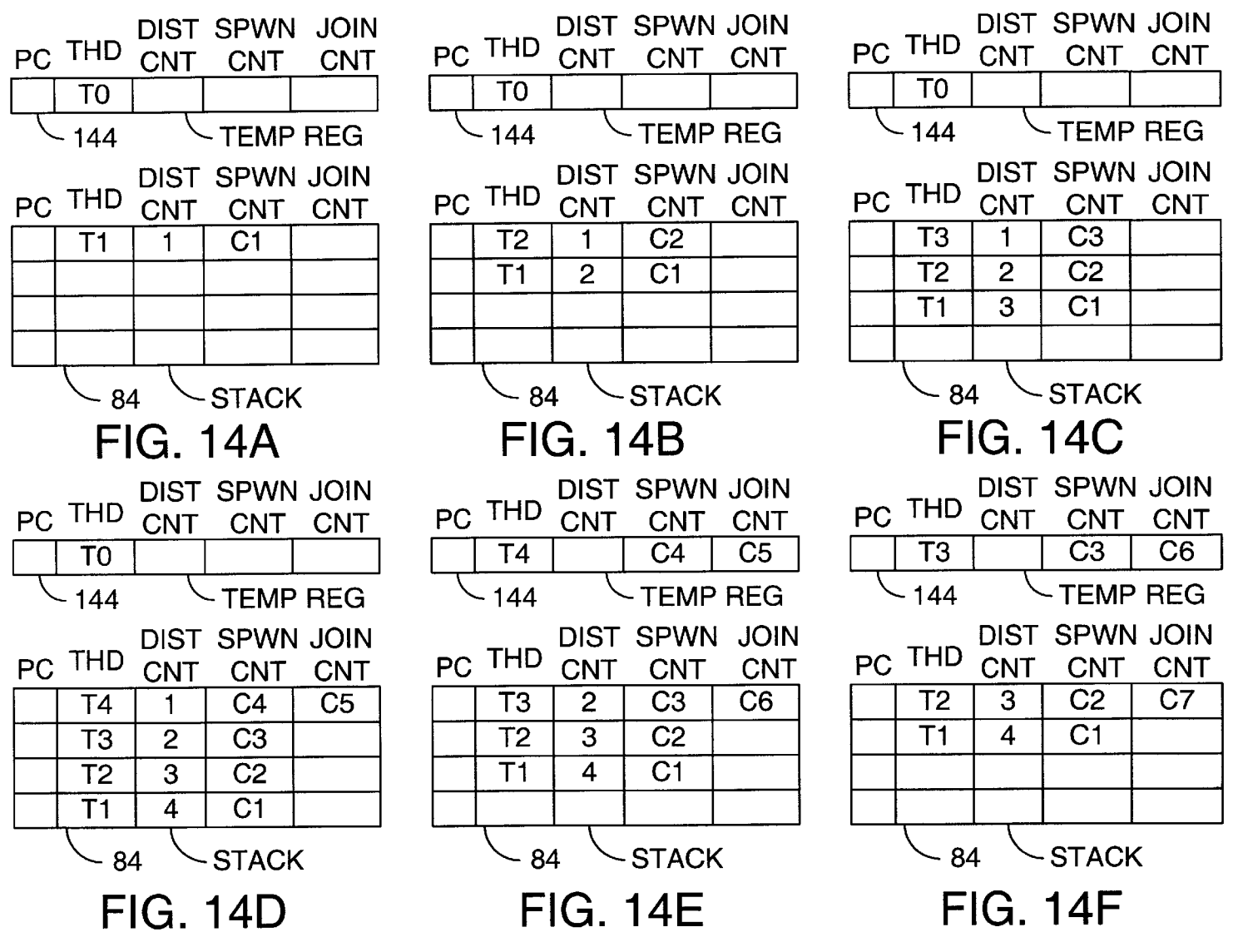

Referring to FIGS. 12 and 14A, as the call 1 instruction is detected, information (e.g., PC value, thread indicia, and spawn count) regarding thread T1 is pushed onto stack 84. A "1" is placed in a distance counter (dist cnt) field. Referring to FIG. 14B, as the call 2 instruction is detected, information regarding thread T2 is pushed onto the stack and the information regarding thread T1 is pushed deeper into stack 84. A "1" is placed in the distance count field of thread T2 and the distance count value of thread T1 is incremented to a "2". Referring to FIGS. 14C and 14D, as the call 3 and call 4 instructions are detected, information regarding threads T3 and T4 are pushed onto the stack in order, and the information regarding thread T1 and T2 are pushed deeper. The distance count fields are incremented as new spawning opportunity instructions are received.

When a potential thread is joined by a thread earlier in program order, the information regarding the potential thread is popped off the stack. As threads are popped off the stack, the distance counts do not decrement, except as described below. Referring to FIG. 14E, after the return 1 instruction is received, thread T0 joins thread T4 and the information regarding thread T4 is popped off stack 84. The distance count of thread T4 is "1" which is less than the threshold of 4, so T4 meets criterion (1). Referring to FIG. 14F, after the return 2 instruction is received, thread T4 joins thread T3 and the information regarding thread T3 is popped off stack 84. The distance count of thread T3 is "2" which is less than the threshold of 4, so thread T4 meets criterion (1).

Note, however, the distance count of thread T1 is 4, which is not less than the threshold of 4, so that thread T1 does not meet criterion (1) of thread goodness. In essence, this is because each of the four trace buffers are likely to be used by threads T0, T2, T3, and T4 so that if thread T1 were created, it would likely be reset to make room for one of threads T2, T3, or T4, which would result in a performance penalty.

Criterion (2) Number of instructions between spawn to join (amount of overlapping execution). If the number of instructions between the spawning opportunity instruction of the potential thread of interest and the joining instruction of the spawning potential thread (which contains the spawning opportunity instruction) to potential thread of interest is relatively small, there will not be much concurrent execution of the spawning thread and the potential thread of interest. In such a case, there will not be much performance benefit and it probably will not be worth spawning the potential thread of interest. Rather, when it is executed, the instructions of the potential thread of interest could be part of the spawning potential thread when executed as an actual thread. For example, referring to FIG. 12, if the number of instructions between call 4, and the first instruction of thread T4 is small, it probably would not be a good use of resources to spawn thread T4. Rather, thread T4 could be part of thread T0.

In one embodiment, the amount of overlap (or concurrent execution) of actual threads is estimated by the difference of the join count and the spawn count of a potential thread. These values are provided in fields of stack 84 and the difference is shown in Table 2, below:

TABLE 2

| Potential Thread of Interest | Overlapping Execution of Spawning Thread and Potential Thread of Interest (Count of joining opportunity instruction minus count of spawning opportunity instruction | Size of Thread (Count of next joining opportunity instruction minus count of joining opportunity instruction of potential thread of interest) |
| --- | --- | --- |
| T1 | C8 - C1 | Not known in the example |
| T2 | C7 - C2 | C8 - C7 |
| T3 | C6 - C3 | C7 - C6 |
| T4 | C5 - C4 | C6 - C5 |

In one embodiment, the difference is compared to a threshold value to determine if criterion (2) of thread goodness is met. Criterion (2) is not met if the difference has a first relationship (e.g., $<$ or $\leq$) to the threshold value and is met if the difference has a second relationship ($>$ or $\geq$) to the threshold value. One factor in determining the magnitude of the threshold value is the number of cycles taken to create and to retire or reset a thread.

Criterion (3) Number of instructions from join to next join (size of potential thread of interest). If the number of instructions of a potential thread of interest is relatively small, it is probably not worth spawning it as an actual thread. The size of the potential thread is compared to a threshold value to determine if criterion (3) of thread goodness is met. Criterion (3) is not met if the size has a first relationship (e.g., $<$ or $\leq$) to the threshold value and is met if the size has a second relationship ($>$ or $\geq$) to the threshold value. One factor in determining the magnitude of the threshold value is the number of cycles taken to create and to retire or reset a thread. Note that the size is only an estimate of the size of an actual thread.

In one embodiment, the size of the potential thread of interest is the difference of the join count of the next thread in program order and the join count of the potential thread of interest. As mentioned, the join count is the count of retired instruction counter 86 at the joining opportunity instruction. The temporary register 144 is used because the join count of the later potential thread is not known until after the potential thread of the interest is popped off stack 84 and placed in temporary register 144. For example, in FIG. 14E, information regarding thread T4 is held in temporary register 144. The size of thread T4 is C6–C5, where C6 is in stack 84 and C5 is in the temporary register. Values for the thread distance are in Table 2, above.

Referring to FIGS. 14D and 14E, as illustrated, the distance count values do not decrement when the thread at the top of the stack is joined. However, in one embodiment, if the thread does not meet criteria (2) and (3), the distance count values of the potential threads are decremented.

In a more sophisticated and complicated mechanism, for criteria (2) and (3), retired thread monitor 82 could consider the type of instructions as well as the number of instructions.

In one embodiment, when a state machine is updated in response to retirement or resetting of an actual thread, the state is changed by two states (e.g., state 3 to state 5, state 6 to state 4, state 0 to state 0), but when the state machine is updated in response to a potential thread meeting or not meeting the test, it is only changed by one state (e.g., state 3 to state 4, state 7 to state 7).

Although the example of FIG. 12 concerns functions, the criteria of thread goodness may also be determined for threads having a backward branch spawning opportunity instruction. For calls, a join may be determined by observing the instruction statically following the spawning opportunity instruction. For loops, it may be determined by observing the loops exit (where the current retired instruction is between the bounds of the start and end of the loop and the next retired instruction is outside these bounds and the next retired instruction is not a call).

C. Additional Information and Embodiments

Referring to FIG. 1, in one embodiment, processor 50 may include a branch prediction unit 60 as part of a fetch unit that includes decoder 106 and program counters (PCs) 112A, 11B, . . . , 112X. Branch prediction unit 60 may include a branch predictor having a correlated predictor and/or a simple predictor. If a branch is correctly predicted taken, the predictor is incremented and if a branch is incorrectly predicted taken, the corresponding count register is decremented. The correlated predictor may contain a branch history shift register that is shifted with each branch.

In one embodiment, there is a return address stack for each thread, to provide a return address from functions. More than one return address stack may be used because in a processor that executes threads out of order, the return from a function in time order may occur before an earlier call in the program. Of course in program order, the call statement comes first. The contents of the return address stack of the spawning thread at the time of the spawn is copied into the return address stack of the spawned thread (i.e., the thread created in response to the spawning opportunity instruction in the spawning thread). Following the copy, returned addresses are pushed and popped on and off of the return address stacks of the spawned and spawning threads independently.

The circuits and details that are described and illustrated are only exemplary. Various other circuits and details could be used in their place. Further, there may be various design tradeoffs in size, latency, etc. There may be intermediate structure (such as a buffer) or signals between two illustrated structures. Some conductors may not be continuous as illustrated, but rather be broken up by intermediate structure. The borders of the boxes in the figures are for illustrative purposes. An actual device would not have to include components with such defined boundaries. For example, a portion of the final retirement logic could be included in the boxes labelled trace buffers. The relative size of the illustrated components is not to suggest actual relative sizes. Arrows show certain data flow in certain embodiments, but not every signal, such as data requests. Where a logical high signal is described above, it could be replaced by a logical low signal and vice versa.

The instructions within a thread may pass from decoder 106 to trace buffers 114 and execution unit 108 entirely in program order or in something other than program order.

The terms "connected," "coupled," and related terms are not limited to a direct connection or a direct coupling, but may include indirect connection or indirect coupling. The term "responsive" and related terms mean that one signal or event is influenced to some extent by another signal or event, but not necessarily completely or directly. If the specification states a component "may", "could", or "might" to be included, that particular component is not required to be included.

Those skilled in the art having the benefit of this disclosure will appreciate that many other variations from the foregoing description and drawings may be made within the scope of the present invention. Accordingly, it is the following claims including any amendments thereto that define the scope of the invention.

What is claimed is:

1. A processor comprising:
   thread management logic including a thread predictor having state machines to indicate whether thread creation opportunities should be taken or not taken; and
   a predictor training mechanism to receive retired instructions and to identify potential threads from the retired instructions and to determine whether a potential thread of interest meets a test of thread goodness, and if the test is met, one of the state machines that is associated with the potential thread of interest is updated in a take direction, and if the test is not met, the state machine is updated in a not take direction.

2. The processor of claim 1, wherein the predictor training mechanism determines whether the potential thread of interest meets one criterion of thread goodness and the test is met if the criterion of thread goodness is met.

3. The processor of claim 1, wherein the predictor training mechanism determines whether the potential thread of interest meets at least one criterion of thread goodness of certain criteria of thread goodness, and the test is met if the at least one criterion of thread goodness is met.

4. The processor of claim 1, wherein the predictor training mechanism determines whether the potential thread of interest meets certain criteria of thread goodness and the test is met if the criteria of thread goodness are met.

5. The processor of claim 1, wherein the test involves determining whether a criterion of thread goodness is met, which criterion involves making an estimate as to whether the potential thread of interest would be reset to make room for another thread earlier in program order if the potential thread of interest were created as an actual thread.

6. The processor of claim 1, wherein the test involves determining whether a criterion of thread goodness is met, which criterion involves determining a number of retired instructions between a spawning opportunity instruction and a joining opportunity instruction of the potential thread of interest, and comparing the number is to a threshold value.

7. The processor of claim 1, wherein the test involves determining whether a criterion of thread goodness is met, which criterion involves determining a number of instructions in the potential thread of interest and comparing the number to a threshold value.

8. The processor of claim 1, wherein the predictor training mechanism includes a stack onto which information representing potential threads is pushed when a retired spawn opportunity instruction is detected and from which information is popped off when a retired joining opportunity instruction is detected and the stack includes a distance count related to a number of potential threads meeting a criterion of thread goodness between a retired spawning opportunity instruction and joining opportunity instruction of the potential thread of interest.

9. The processor of claim 8, wherein the predictor training mechanism includes a retired instruction counter that provides a count presenting the retired instructions and wherein the stack further includes fields holding count values for spawning opportunity instructions and joining opportunity instructions.

10. A processor comprising:
    thread management logic to control creation of an actual thread, the thread management logic including reset logic to control whether the actual thread is reset and a thread predictor having state machines to indicate whether thread creation opportunities should be taken or not taken, and wherein if the actual thread is reset, one of the state machines associated with the actual thread is updated in a not take direction; and final retirement logic to control whether the actual thread is retired, and wherein if the actual thread is retired, the state machine associated with the actual thread is updated in a take direction, the final retirement logic including a predictor training mechanism to receive retired instructions and to identify potential threads from the retired instructions and to determine whether a potential thread of interest meets a test of thread goodness, and if the test is met, one of the state machines that is associated with the potential thread of interest is updated in a take direction, and if the test is not met, the state machine associated with the potential thread of interest is updated in a not take direction.

11. The processor of claim 10, wherein the state machine associated with the actual thread is the same state machine associated with the potential thread of interest if the actual thread and potential thread of interest have the same index into the state machine.

12. The processor of claim 11, wherein the index of the actual thread includes bits of an address of the actual thread and the index of the potential thread includes bits of an address of the potential thread.

13. The processor of claim 12, wherein more than one state machine is associated with the actual thread and each of the state machines that is associated with the actual thread is updated if the actual thread is reset or retired and wherein more than one state machine is associated with the potential thread and each of the state machines that is associated with the potential thread is updated if the potential thread is or is not a good potential thread.

14. The processor of claim 13, wherein the state machines include simple and correlated predictors and wherein a simple predictor are indexed through at least some of the address bits of the actual thread, thread opportunity, or potential thread of interest and a correlated predictor is indexed through some of the address bits of the actual thread, thread opportunity, or potential thread of interest and bits related to the thread lineage of the actual thread, thread opportunity, or potential thread of interest processed through a function.

15. The processor of claim 14, wherein the function is an exclusive-OR function.

16. The processor of claim 14, wherein the simple predictor is not used after the thread lineage is established.

17. The processor of claim 14, wherein if the potential thread of interest has the same index as a recently retired or reset actual thread, the final retirement logic does not update the associated state machine in response to whether or not the potential thread of interest is a good potential thread.

18. The processor of claim 14, wherein the state machine associated with an actual or potential thread may be update twice, once for the potential thread and once for a recently retired actual thread with the same index.

19. The processor of claim 10, wherein the state machines are indexed through at least some of the address bits of the thread opportunities.

20. A processor comprising:

an execution pipeline to concurrently execute at least portions of actual threads;

detection circuitry to detect speculation errors involving thread dependencies in the execution of the actual threads;

trace buffers outside the execution pipeline to hold instructions of the actual threads;

triggering logic to trigger re-execution of instructions from the trace buffers associated with the speculation errors;

thread management logic to control creation of an actual thread, the thread management logic including reset logic to control whether the actual thread is reset and a thread predictor having state machines to indicate whether thread creation opportunities should be taken or not taken, and wherein if the actual thread is reset, one of the state machines associated with the actual thread is updated in a not take direction; and final retirement logic to control whether the actual thread is retired, and wherein if the actual thread is retired, the state machine associated with the actual thread is updated in a take direction.

21. The processor of claim 20, further comprising:

a predictor training mechanism to receive retired instructions and to identify potential threads from the retired instructions and to determine whether a potential thread of interest meets a test of thread goodness, and if the test is met, one of the state machines that is associated with the potential thread of interest is updated in a take direction, and if the test is not met, the state machine associated with the potential thread of interest is updated in a not take direction.

22. The processor of claim 20, wherein more than one state machine is associated with the actual thread and each of the state machines that is associated with the actual thread is updated if the actual thread is reset or retired.

* * * * *

UNITED STATES PATENT AND TRADEMARK OFFICE
CERTIFICATE OF CORRECTION

PATENT NO. : 6,247,121 B1  
DATED : June 12, 2000  
INVENTOR(S) : Akkary et al.

It is certified that error appears in the above-identified patent and that said Letters Patent is hereby corrected as shown below:

Column 2,  
Line 58, delete "14E, and 14E" and insert -- 14E, and 14F --.

Column 10,  
Line 21, delete "arid" and insert -- and --.

Column 12,  
Line 22, delete "riot take state" and insert -- not take state --.

Signed and Sealed this

Seventh Day of May, 2002

Attest:

JAMES E. ROGAN  
*Attesting Officer*     *Director of the United States Patent and Trademark Office*